No. 698,397. Patented Apr. 22, 1902.
J. A. EKELUND.
FOLDING BICYCLE LUNCH BOX.
(Application filed Feb. 25, 1901.)
(No Model.)
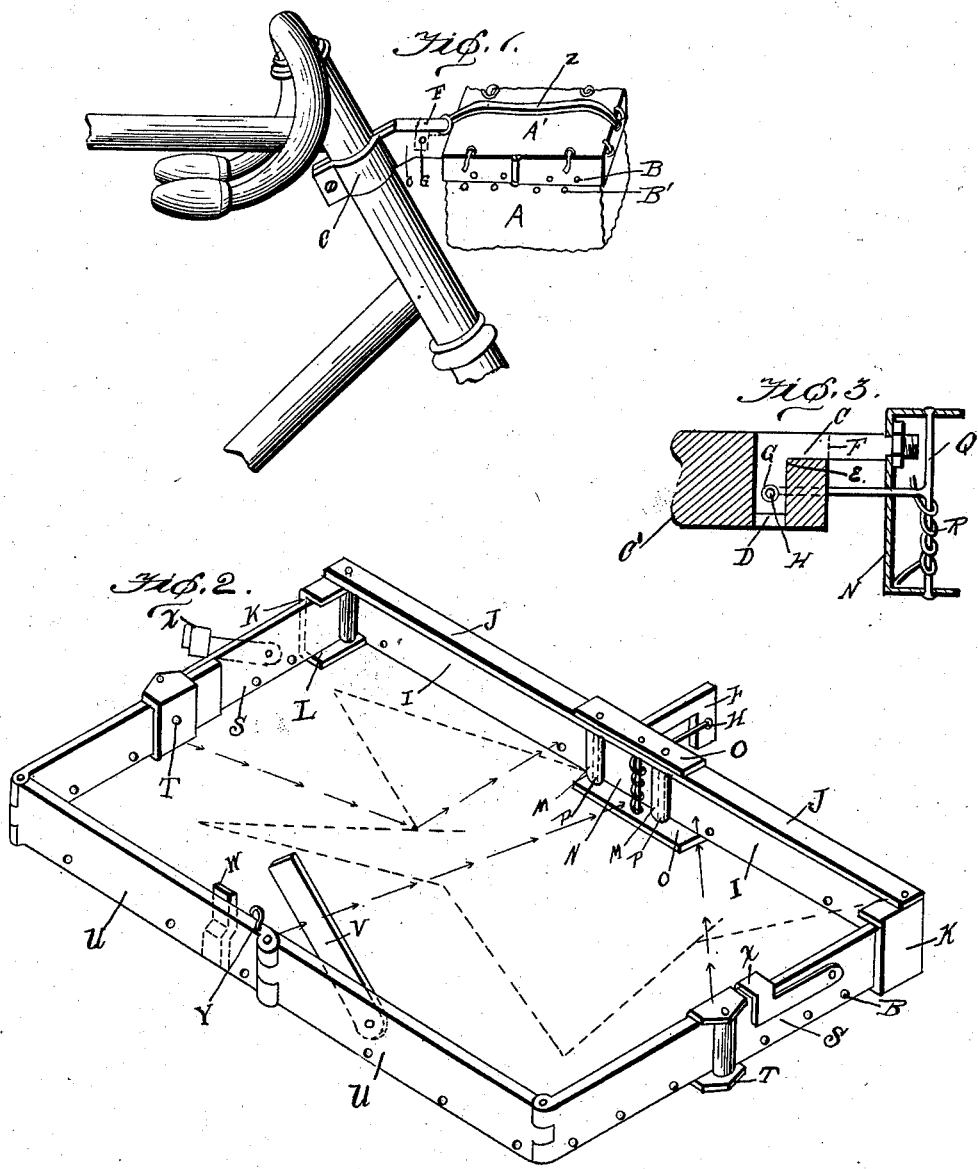
WITNESSES:
INVENTOR
John A. Ekelund
BY Sanborn & Kidt,
ATTORNEYS

UNITED STATES PATENT OFFICE.

JOHN A. EKELUND, OF MINNEAPOLIS, MINNESOTA, ASSIGNOR OF ONE-FOURTH TO NELS A. JOHNSON, OF MURDOCK, MINNESOTA.

FOLDING BICYCLE LUNCH-BOX.

SPECIFICATION forming part of Letters Patent No. 698,397, dated April 22, 1902.

Application filed February 25, 1901. Serial No. 48,738. (No model.)

*To all whom it may concern:*

Be it known that I, JOHN A. EKELUND, a citizen of the United States, residing at No. 1846 Jackson street, in the city of Minneapolis, in the county of Hennepin and State of Minnesota, have invented a new and useful Folding Bicycle Lunch-Box, of which the following is a specification.

This invention relates to a folding bicycle lunch-box, and has for its object to provide a lunch-box that can be conveniently attached to a bicycle and which can also be used for carrying small parcels, &c.

A further object is to provide new and improved devices for folding the lunch-box into compact form, so as to be easily and handily carried in the pocket.

A further object is to provide means for carrying the lunch-box in the hand.

I attain these objects by the device illustrated in the accompanying drawings, in which—

Figure 1 is a perspective view of the lunch-box, showing it attached to a bicycle. Fig. 2 is an isometric view of the folding frame of the lunch-box. Fig. 3 is a sectional view of the means for attaching the lunch-box to a bicycle.

Referring to the drawings, in which like letters represent like parts, A represents the box proper, which is composed of cloth or other flexible material and which is laced onto the under side of the frame with any ordinary string by means of the eyelets or holes B B'.

A' represents a cover to the box and is composed of any flexible material and is attached to the back side of the frame of the box by means of a cord or other suitable fastening and is adapted to be attached or fastened by means of spring-hooks or in any suitable manner over the top of the box.

B represents eyelets or holes near the lower edge of the frame and are a proper distance apart to serve for lacing or fastening the box A to the frame.

B' represents eyelets or holes in the top edge of the box A and serve, in conjunction with the holes B, for lacing or fastening the box A to the frame.

C represents a clamp of ordinary construction adapted to encircle the front post of a bicycle and has a projection C' entering horizontally forward therefrom and serves for attaching the lunch-box to the bicycle. The projection C' has near one end a square hole D, extending transversely through projection C' and has on the upper side and extending from the hole D to the front end of projection C' a groove E, which hole D and groove E are adapted to receive the L-shaped hook F.

G represents a hole extending through projection C' and at right angles to the hole D.

F represents the L-shaped hook rigidly fastened at its longer end to the center of the back side of the frame of the box and has near its shorter end a hole H, registering with the hole G when the hook F is in position as shown in Figs. 1 and 3.

I I represent strips of sheet metal having one edge turned to form an angular flange J J and having their opposite ends bent to form angular ends K K, said ends having their lower edges turned, forming angular flanges L. The strips I I have their other ends turned to form cylinderical tubes M M. The ends K K serve as stops, against which the ends of the frame of the box press when open.

N represents a strip of sheet metal having its edges turned to form the angular flanges O O and has on its back side the L-shaped hook F rigidly attached. The flanges O O have near their ends rivets P P, extending through the cylindrical tubes on the ends of the strips I I and being riveted to the flanges O O, thereby forming a hinged joint with the strips I I.

Q represents a T-shaped rod having the end of its head pivotally attached to the flanges O O, and having its stem extending through a slot in the strip N, and having on its end an angular projection adapted to engage with the holes G and H, and serves to hold the L-shaped hook F detachably in the clamp C.

R represents a spiral spring encircling one end of the head of the T-shaped rod Q, and having one end engaging the stem of said rod and the end bearing against the strip N, and serves to hold the stem of the T-shaped rod Q normally in engagement with the holes G and H.

S S represent the ends of the frame of the box and are similar in construction. Hence I will describe but one. S is composed of two strips of sheet metal, which are connected by means of a clevis-hinge T. One end of the strip S is provided with a cylindrical tube, which is hingedly attached to one end of the strip I by means of a rivet. The other end of the strip S is hingedly attached to the ends of the front of the frame.

U U represent two metal strips composing the front of the frame of the box and are of equal length and are hingedly attached together at one end. The other ends of the strips U U are hingedly attached to the ends of S S.

V represents a strip pivotally attached on the inside of one of the strips U and serves to lock the hinge-joint when the box is open.

W represents a Z-shaped lug rigidly attached to the inside of the other of the strips U and serves as a catch for the locking-strip V.

X X represent L-shaped hooks or clamps having their longer ends pivotally attached, by means of rivets, to the inside of one portion of the ends of the box, and having their opposite ends bent to form a hook or clamp adapted to clamp the two parts of the end of the frame together, and serve to lock the clevis-hinge T in an open position.

Y represents a hook formed from the end of the rivet which extends through the hinge-joint on the front of the box and serves as a means for attaching one end of the handle Z to the frame of the box.

Z represents a handle, of any flexible material, one end of which is attached by any suitable means to the hook F, the opposite end being adapted to engage the hook Y.

In operation this box may be readily attached to or removed from the bicycle by pulling the end of the stem of the T-shaped rod out of engagement with the hole H in the hook F, thereby allowing the box to be readily lifted from or inserted into the clamp C. In folding the box the locking-strip V is raised out of engagement with the lug W and is turned back on the strip U. Then the clamps X X being released the frame can be easily folded, as indicated by the dotted lines and arrows in Fig. 2, thus making the box into a compact form and which can be easily carried in a pocket.

It is evident that slight changes may be made in the form and arrangements of the several parts described without departing from the spirit and scope of my invention, and hence I do not wish to be limited to the exact construction herein set forth; but, Having described my invention, what I desire to claim as new and secure by Letters Patent, is—

1. In a folding or collapsible box consisting of a jointed metal frame having clamping-lugs pivotally attached thereto, the sides, ends and bottom of the box formed from cloth or other flexible material, cords or laces for attaching the sides, ends and bottom to the frame, an L-shaped hook rigidly attached to said frame, and means for removably attaching the box to a bicycle consisting of a clamp having a forward extension, and an L-shaped recess in said extension to receive the hook, substantially as described.

2. In combination a folding box, a top frame consisting of a centrally-hinged front member, side members hinged to the ends of the front member, and hinged intermediate of their lengths, and a centrally-hinged rear member having the side hinged to its ends, a flexible box connected to the frame, a flanged plate embracing said central portion of the rear member of the frame, an L-shaped hook carried by said plate, a spring-catch carried by said plate and means for connecting the box to a bicycle-frame detachably engaging the hook and held in rigid engagement by the spring-catch.

3. In combination a folding box, a top frame consisting of a centrally-hinged front member, side members hinged to the ends of the front member, and hinged intermediate of their lengths, and a centrally-hinged rear member having the side hinged to its ends, a flexible box connected to the frame, a flanged plate embracing said central portion of the rear member of the frame, an L-shaped hook carried by said plate, consisting of a clamp having a forward extension and an L-shaped recess in said extension to receive the hook.

JOHN A. EKELUND.

Witnesses:
CHARLES M. MORTON,
HAROLD J. BENNER.